(12) United States Patent
Chen et al.

(10) Patent No.: US 8,358,267 B2
(45) Date of Patent: Jan. 22, 2013

(54) CONJOINED INPUT KEYS ADJACENT A NAVIGATION TOOL ON A HANDHELD ELECTRONIC DEVICE

(75) Inventors: Chao Carl Chen, Waterloo (CA); Cortez Corley, Waterloo (CA); Todd Wood, Guelph (CA); Jana Lynn Papke, Milton (CA)

(73) Assignee: Research In Motion Limited, Waterloo (CA)

( * ) Notice: Subject to any disclaimer, the term of this patent is extended or adjusted under 35 U.S.C. 154(b) by 1078 days.

(21) Appl. No.: 11/855,021

(22) Filed: Sep. 13, 2007

(65) Prior Publication Data

US 2009/0073115 A1  Mar. 19, 2009

(51) Int. Cl.
*G09G 5/00* (2006.01)
(52) U.S. Cl. ........................................ 345/156
(58) Field of Classification Search ............. 345/156
See application file for complete search history.

(56) References Cited

U.S. PATENT DOCUMENTS

| | | | |
|---|---|---|---|
| 5,504,286 A | 4/1996 | Tsai | |
| 6,392,634 B1* | 5/2002 | Bowers et al. | 345/163 |
| 2003/0107555 A1 | 6/2003 | Williams | |
| 2005/0190083 A1* | 9/2005 | Tyneski et al. | 341/22 |
| 2007/0200734 A1 | 8/2007 | Lee et al. | |
| 2007/0200828 A1* | 8/2007 | Skillman et al. | 345/169 |

FOREIGN PATENT DOCUMENTS

| | | |
|---|---|---|
| EP | 1681618 A | 7/2006 |
| EP | 1681618 A1 | 7/2006 |
| EP | 1808744 A | 7/2007 |
| EP | 1808744 A1 | 7/2007 |
| EP | 1818761 A1 | 8/2007 |
| GB | 2399922 A | 9/2004 |

OTHER PUBLICATIONS

European Search Report 07116383.6; Jan. 16, 2008.
European Examiner Report—07116383.6 d.Jul. 31, 2008.
English translation of the Office Action mailed Mar. 12, 2012. In corresponding Taiwan patent application No. 097131962.
Office Action mailed Mar. 12, 2012. In corresponding Taiwan patent application No. 097131962.
English translation to the First Office Action mailed Apr. 25, 2012. In corresponding Republic of China patent application No. 200810160824.X.

(Continued)

*Primary Examiner* — Dennis Joseph
(74) *Attorney, Agent, or Firm* — Novak Druce + Quigg LLP

(57) ABSTRACT

A handheld electronic device configured to receive text messages has a body with a front face and top and bottom portions relative to text entry use orientation of the handheld device. A display screen is located on the front face of the body. The display screen presents information to the operator of the handheld device. A microprocessor located within the device is configured to receive operator commands from user inputs located on the device and instruct commensurate changes to the display screen. A navigation row of user inputs is located on the front face of the body below the display. The navigation row of user inputs includes a multi-directional navigation tool assembly laterally flanked by a pair of conjoined, depressibly actuable input keys. Each of the inputs keys is located substantially opposite the other across the navigation tool assembly and positioned adjacent to lateral sides of the navigation tool assembly.

19 Claims, 7 Drawing Sheets

OTHER PUBLICATIONS

Detailed English translation to the First Office Action mailed Apr. 25, 2012. In corresponding Republic of China patent application No. 200810160824.X.

First Office Action mailed Apr. 25, 2012. In corresponding Republic of China patent application No. 200810160824.X.

* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L |   |
| Z | X | C | V | B | N | M |   |   |   |

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L |   |
| Y | X | C | V | B | N | M |   |   |   |

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L |   |
| W | X | C | V | B | N | M |   |   |   |

| 1 | 2 | 3 | 4 | 5 | 6 | 7 | 8 | 9 | 0 |
|---|---|---|---|---|---|---|---|---|---|
|   |   | P | Y | F | G | C | R | L |   |
| A | O | E | U | I | D | H | Y | N | S |
|   | Q | J | K | X | B | M | W | V | Z |

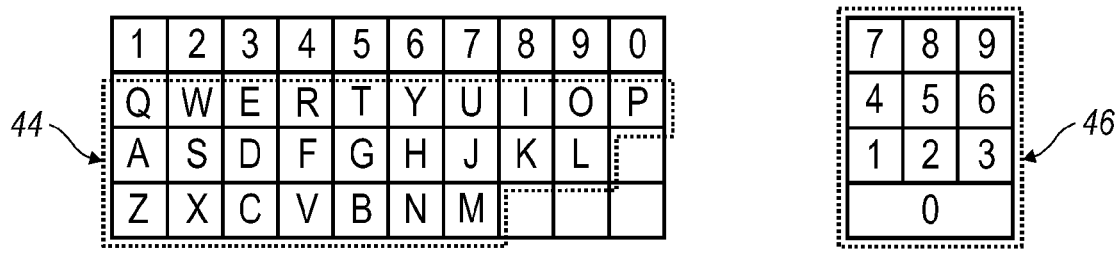
FIG. 4
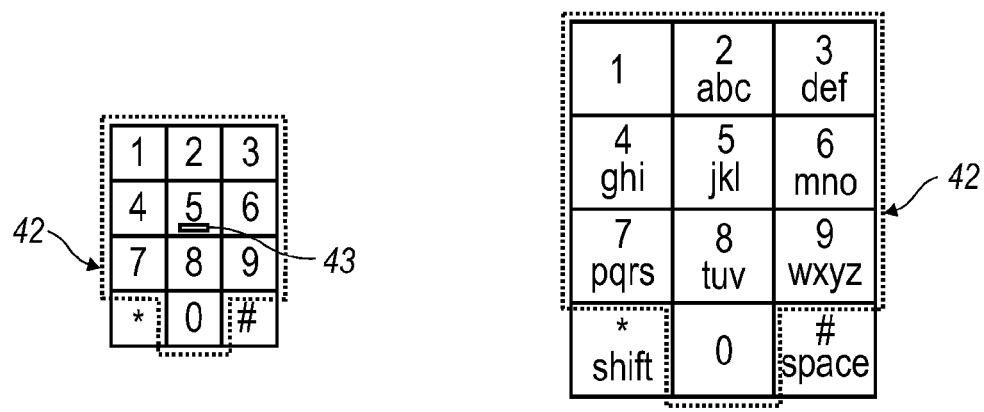
FIG. 5  FIG. 6

CONJOINED INPUT KEYS ADJACENT A NAVIGATION TOOL ON A HANDHELD ELECTRONIC DEVICE

FIELD

This disclosure, in a broad sense, is directed toward a handheld electronic device that has wireless communication capabilities and the networks within which the wireless communication device operates. The present disclosure further relates to providing conjoined input keys adjacent to a navigation tool on a handheld electronic device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigation device are proximately located to one another.

It is desirable to further integrate the navigation devices on the handheld device with the input keys presented thereon.

BRIEF DESCRIPTION OF THE DRAWINGS

Examplary methods and arrangements conducted and configured according to the advantageous solutions presented herein are depicted in the accompanying drawings wherein:

FIG. 3a illustrates an examplary QWERTY keyboard layout;

FIG. 3b illustrates an examplary QWERTZ keyboard layout;

FIG. 3c illustrates an examplary AZERTY keyboard layout;

FIG. 3d illustrates an examplary Dvorak keyboard layout;

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
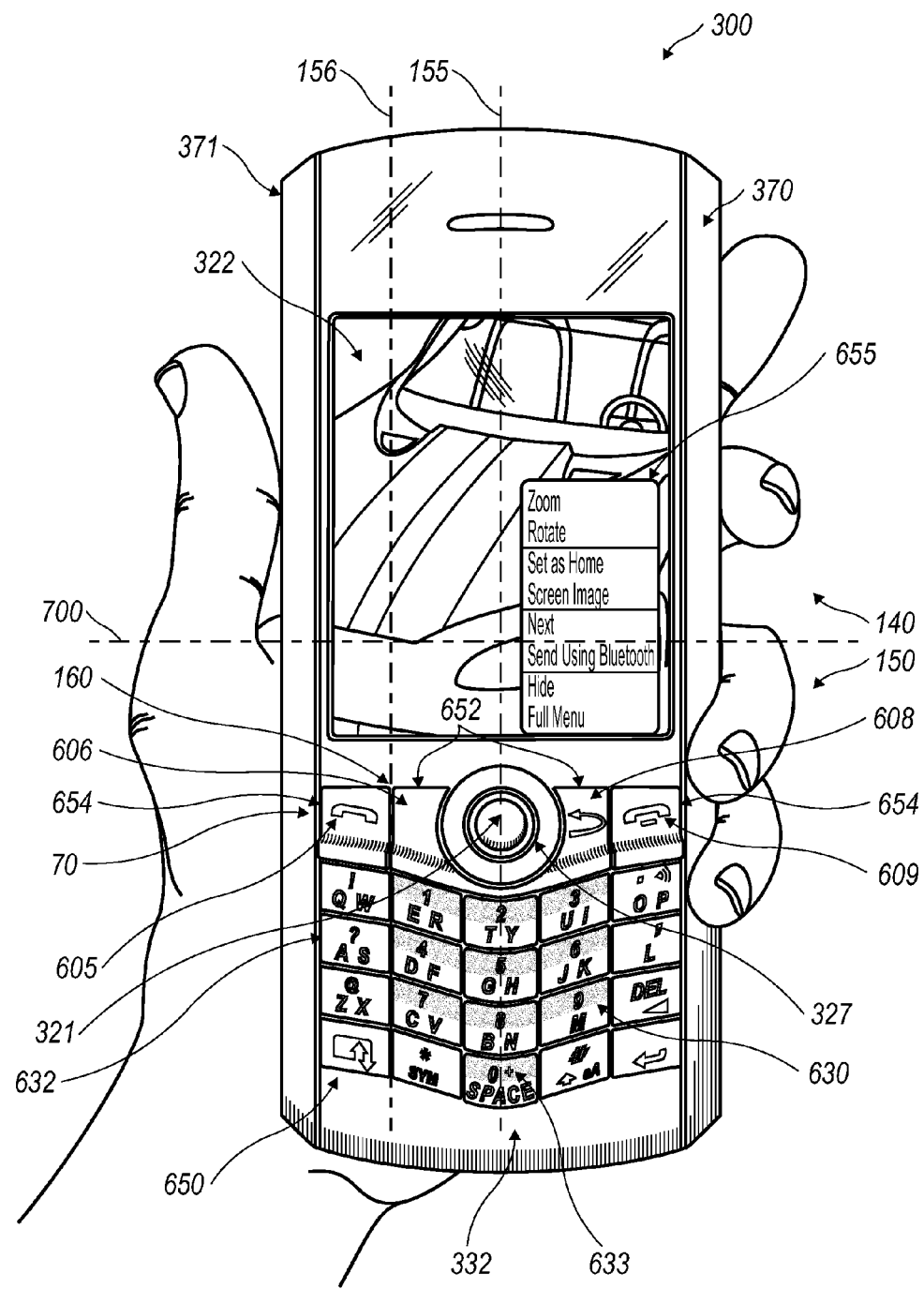
FIG. 1 illustrates a handheld wireless communication device configured according to the present teachings cradled in the palm of a user's hand.
Figure 2:
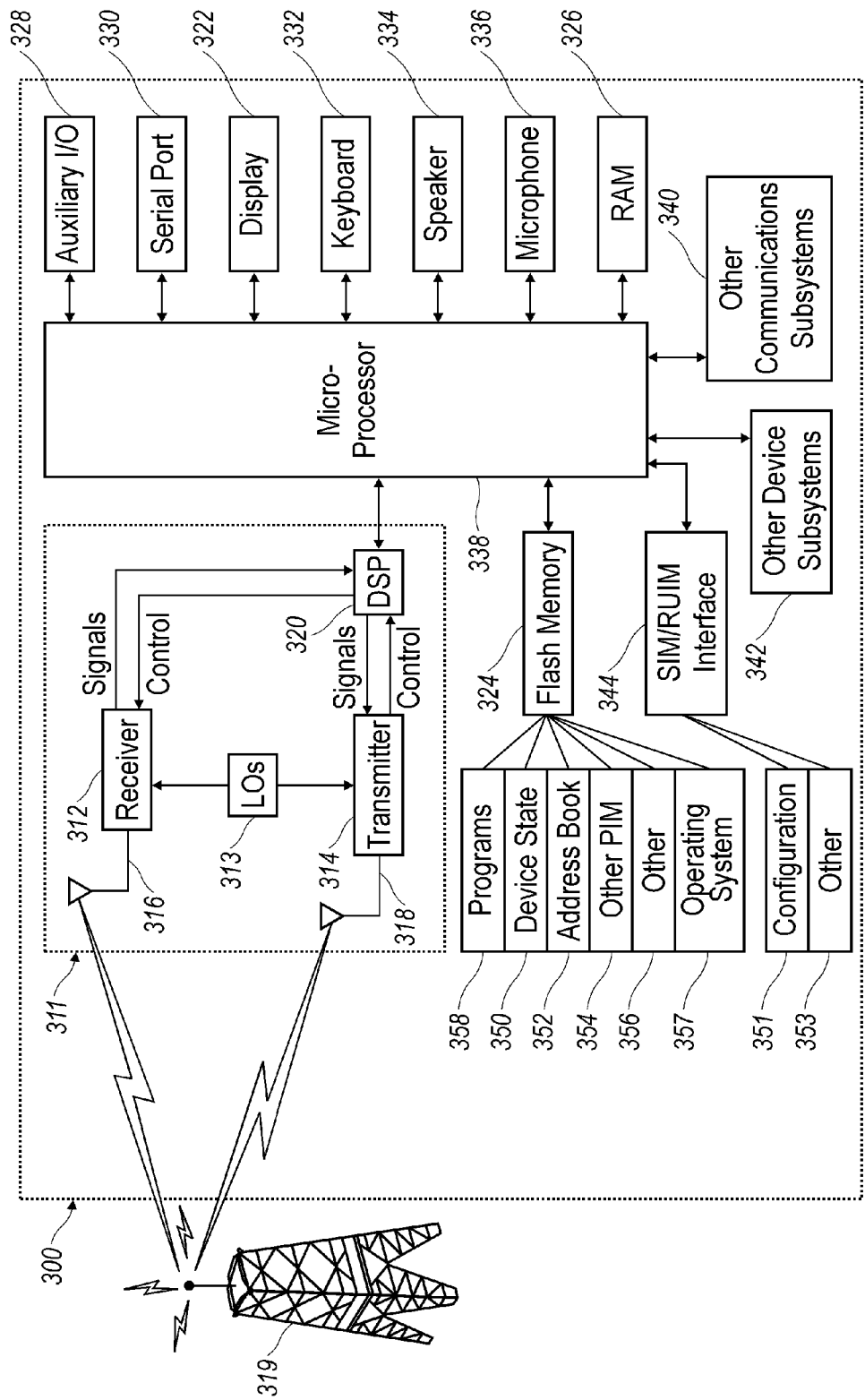
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a trackball navigation tool 321 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. The front face 370 of the device has a navigation row 70 and a key field 650 that includes alphanumeric keys 630, alphabetic keys 632, numeric keys 633, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input that acts as a cursor navigation tool 327 and which is also exteriorly located upon the front face 370 of the device 300. Its front face location is particularly advantageous because it makes the tool easily thumb-actuable like the keys of the keyboard. A particularly usable embodiment provides the navigation tool 327 in the form of a trackball 321 which is easily utilized to instruct two-dimensional screen cursor movement in substantially any direction, as well as act as an actuator when the trackball 321 is depressed like a button. The placement of the navigation tool 327 is preferably above the keyboard 332 and below the display screen 322; here, it avoids interference during keyboarding and does not block the user's view of the display screen 322 during use. (See FIG. 1).

As illustrated in FIG. 1, the present disclosure is directed to a handheld wireless communication device 300 configured to send and receive text messages. The handheld device 300 includes a hand cradleable body 371 configured to be held in one hand by an operator of the device during text entry. The hand cradleable body 371 is elongate with a longitudinal axis 156 parallel to the vertical centerline 155 relative to the text entry orientation. A display 322 is included that is located on a front face 370 of the body 371 and upon which information is displayed to the operator during text entry. A key field 650 is also located on the front face 370 of the body 371 and comprises a plurality of keys including a plurality of alphanumeric keys 630, symbol keys, and function keys. Further, the device 300 is configured such that the display 322 is located in the top portion 140 of the body 371 during text entry and the key field 650 is located in the bottom portion 150 of the body 371 during text entry. The key field 650 and navigation row 70 of user inputs are substantially mirror symmetric about a vertical centerline 155. A navigation row 70 including menu keys 652 and a navigation tool 327 is also located on the front face 370 of the body 371. The alphanumeric input keys 630 comprise a plurality of alphabetic keys 632 and numeric keys 633 having letters and numbers associated therewith. The order of the letters of the alphabetic keys 632 on the presently disclosed handheld device 300 can be described as being of a traditional, but non-ITU Standard E.161 layout. This terminology has been utilized to delineate the fact that such a telephone keypad as depicted in FIG. 6 may not allow for efficient alphabetic text entry on the handheld device 300.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the navigation tool 327) at the outer ends of the navigation row 70. One of the two call keys is a call initiation key 605, and the other is a call termination key 609. The navigation row 70 also includes another pair of keys ("flanking keys") that are located immediately adjacent to the navigation tool 327, with one flanking key on either side of the navigation tool 327. It is noted that the outer keys are referred to as such not because they are necessarily the outermost keys in the navigation row 70—there may be additional keys located even further outwardly of the outer keys if desired—but rather because they are located outwardly with respect to the flanking keys. The flanking keys, otherwise known as the pair of conjoined, depressibly actuable input keys 652 may, for instance, include a menu call-up key 606 and an escape or back key 608. The menu call-up key 606, upon actuation, displays an available action menu 655 on the display 322 and the escape key 608, upon actuation, displays a previously presented application page on the display 322. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an examplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
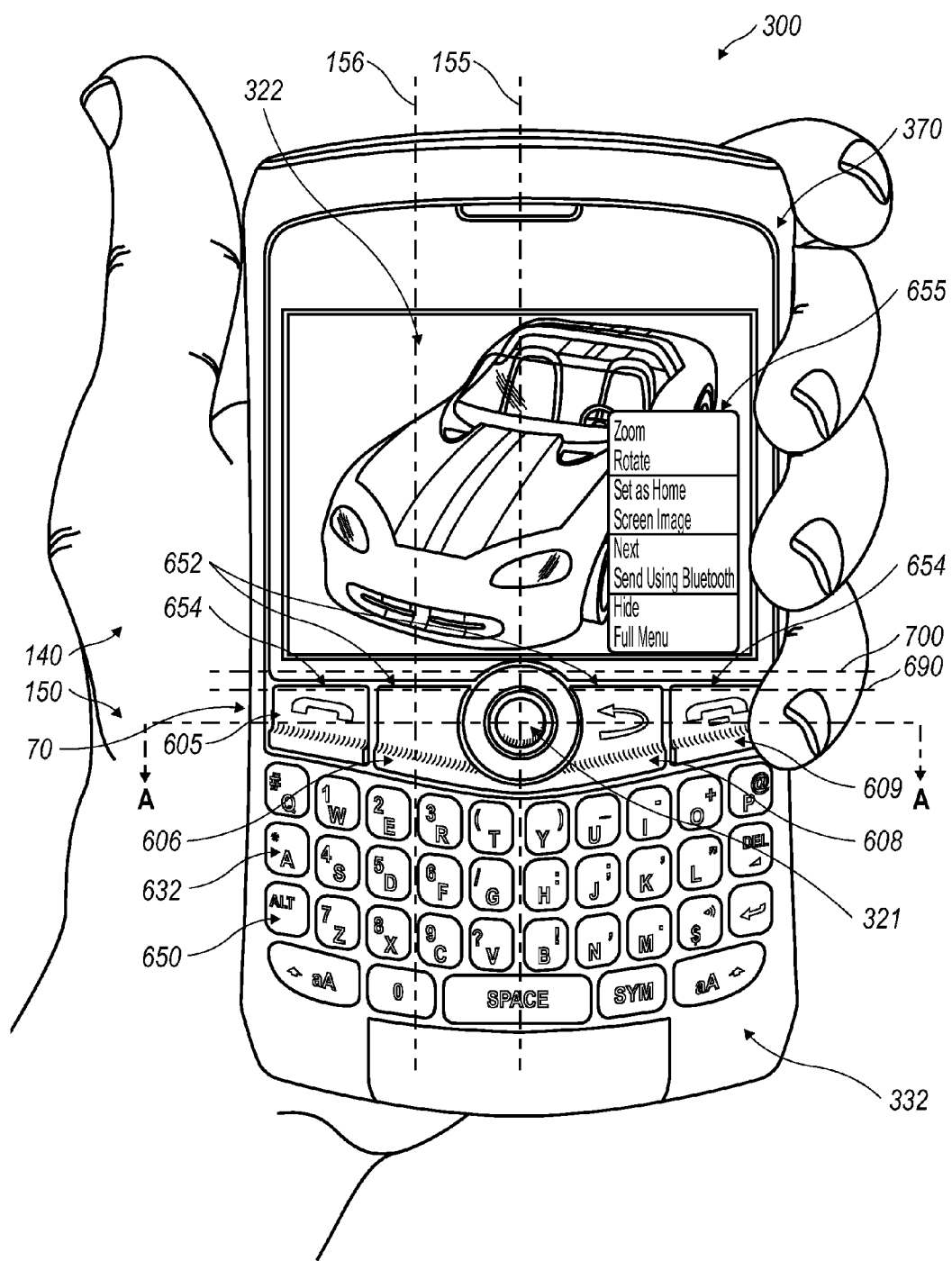
FIG. 7 illustrates a full keyboard handheld electronic device according to the present disclosure.

Reference is now made to FIG. 7, which discloses an examplary embodiment having a full alphabetic keyboard arrangement. In particular, as shown in FIG. 7, only one letter of the alphabet is associated with any given alphabetic key within the keys of the keyfield. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

In at least one embodiment, a handheld wireless communication device 300 that is configured to send and receive email text messages comprises a hand cradleable body 371 configured to be held in a text entry orientation by an operator or user. (For example see FIGS. 1 and 7). The body 371 of the handheld wireless communication device 300 has a front face 370 at which a display screen 322 is located and upon which information is displayed to the operator of the handheld device 300 in the text entry orientation. The handheld device 300 further comprises a microprocessor configured to run software programs on the handheld device 300 and to receive operator commands from user inputs, such as a keyboard 332 and trackball 321, located on the handheld device 300.

In one embodiment as illustrated in at least FIG. 1, the handheld electronic device 300 is configured to receive text messages and includes a body 371 with a front face 370. The body 371 of the handheld electronic device 300 also includes a top portion 140 and a bottom portion 150 relative to text entry use orientation of the device 300. The body 371 of the device 300 is hand cradleable such that it is configured to be held in one hand during text entry. Similarly, the body 371 has a vertical centerline 155. The handheld electronic device 300 also includes a display screen 322 located on the front face 370 of the body 371 and upon which information is displayed to an operator of the handheld device 300. The handheld electronic device also includes a microprocessor 338 configured to receive operator commands from user inputs 160 located on the handheld device 300 and to instruct commensurate changes to the display screen 322. A navigation row 70 of user inputs 160 can be located on the front face 370 of the body 371 below the display screen 322 in the text entry use orientation of the handheld device 300. The navigation row 70 of user inputs can include a multi-directional navigation tool assembly 327 laterally flanked by a pair of conjoined, depressibly actuable input keys 652. Each of the input keys 652 is located substantially opposite the other across the navigation tool assembly 327 and positioned adjacent to the lateral sides of the navigation tool assembly 327. In at least one example, the multi-directional navigation tool assembly 327 can be a trackball 321 located between the pair of conjoined, depressibly actuable input keys 652. The navigation row 70 further includes a pair of outer keys 654, each outer key being located substantially opposite to one another across the navigation tool assembly 327. Each outer key 654 is outboardly positioned adjacent to a laterally outer edge of the conjoined, depressibly actuable input keys 652. One of these outer keys 654 is a call cancel key 609. Likewise, one of these outer keys 654 is a call key 605. In one embodiment, the right hand outer key is the call cancel key 609 and the left hand outer key is the call key 605.

Further examplary embodiments of the conjoined, depressibly actuable input keys 652 are further described herein in relation to FIGS. 1 and 7-11. As illustrated in FIGS. 1 and 7, a trackball 321 is shown positioned between the conjoined, depressibly actuable input keys 652. As illustrated, the conjoined, depressibly actuable input keys 652 covers between one half and three quarters of the area surrounding the trackball 321. While in other embodiments, the conjoined, depressibly actuable input keys 652 can surround a substantial majority of the trackball 321. While in still further embodiments, the conjoined, depressibly actuable input keys 652 can surround substantially all of the trackball 321. The remaining examplary embodiments as described herein are generally described in relation to the trackball 321, but the above described navigation tools can be substituted in its place. The conjoined, depressibly actuable input keys 652 function as two independent keys such as a menu key 606 and a back key 608.

The conjoined, depressibly actuable input keys 652 provide an enhanced user interface for navigational control on a handheld electronic device 300. The conjoined, depressibly actuable input keys 652 as illustrated substantially flank either side of the trackball 321 and are conjoined at a bottom portion located beneath the trackball 321. This portion located beneath the trackball 321 allows for a single key structure be made such that the conjoined, depressibly actuable input keys 652 can function as one key, two keys, or some combination thereof. This bottom portion provides a uniform surface surrounding the trackball 321. Furthermore, the conjoined, depressibly actuable input keys 652 conforms substantially to the shape of the trackball 321. This conformance further enables an enhanced user experience in relation to the actuation of the inputs keys 652 as well as actuation of the trackball 321. The upper surface of the conjoined, depressibly actuable input keys 652 can be further shaped such that it allows the user enhanced engagement of the input keys 652. This can include tapering the input keys 652, providing ridges on the outer edges of the input keys 652, or the like.

The shape and relation to trackball and keyfield 650 can be further understood in relation to the embodiment as illustrated in FIG. 7. The top boundary 690 of the navigation row 70 is substantially a horizontally line, which in one embodiment is substantially parallel to the bottom of the display screen 322. Additionally, the trackball 321 extends beyond the top boundary of the navigation row 70. While in another embodiment, the trackball 321 can break into the top portion 140 of the device 300. In the illustrated embodiment, the bottom boundary of the navigation row 70 is a curved one which is tapered to run parallel with the curve of the key field 650. Specifically, the key field 650 is curved such that in a given row of keys the column of key closest to the vertical centerline 155 are positioned further away from the horizontal line 700 dividing the top portion 140 from the bottom portion 150. Thus, the bottom boundary of the navigation row 70 and the top boundary of the key field 650 are substantially parallel to one another. The conjoined, depressibly actuable input keys 652 are located within the navigation row 70 and immediately surrounds the trackball 321. Furthermore, the trackball 321 is located within a recess 170 at the front face 370 of the body 371 of the handheld electronic device 300. This is further described in connection with FIGS. 9-11. The left side of the conjoined, depressibly actuable input keys 652 can function independently of the right side, and as illustrated is a menu key 606. The menu key is capable of displaying the menu 655 shown on the display screen 322. The menu 655 lists the available user action items associated with the application currently running on the microprocessor of the handheld electronic device 300. The menu 655 can also provide some user action items that are uniform and independent of the application running on the microprocessor. The right side of the conjoined, depressibly actuable input keys 652 is an escape key 608

Figure 8:
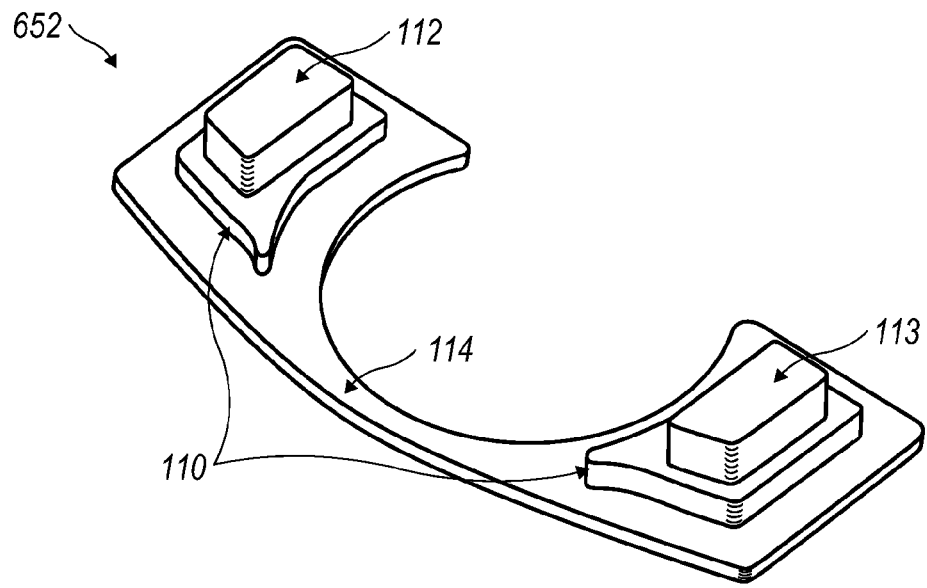
FIG. 8 illustrates an examplary rear-view of the pair of conjoined, depressibly actuable input keys.

Reference is now made to FIG. 8, which illustrates a rear view embodiment of the pair of conjoined, depressibly actuable input keys 652. Two extension portions (112, 113) project from a lower surface of a face-plate portion 110 of the respective input key enabling the respective side of the key 652 to actuate a switch or other detection device associated with inputting of commands to the microprocessor of the handheld electronic device 300. The area and thickness of the conjoined, depressible input keys 652 progressively narrows towards its center, such that it has central portion 114 that is narrower than the remainder of the keys. This central portion in the illustrated embodiment is the narrowest portion of the input keys 652, but in other embodiments it can be wider than other portions of the input keys 652. In one embodiment the central portion 114 narrows such that it is approximately 1 to 2 millimeters wide. Alternatively, the central portion 114 can have an area of approximately 1×1 mm. This central portion 114 of the input keys 652 enables it to remain conjoined and better fit the spatial requirements of the navigation row 70 and trackball 321. Furthermore, the central portion 114 can be adjusted to fit together within other configurations of navigation tools 327 and key fields 650.

Figure 9:
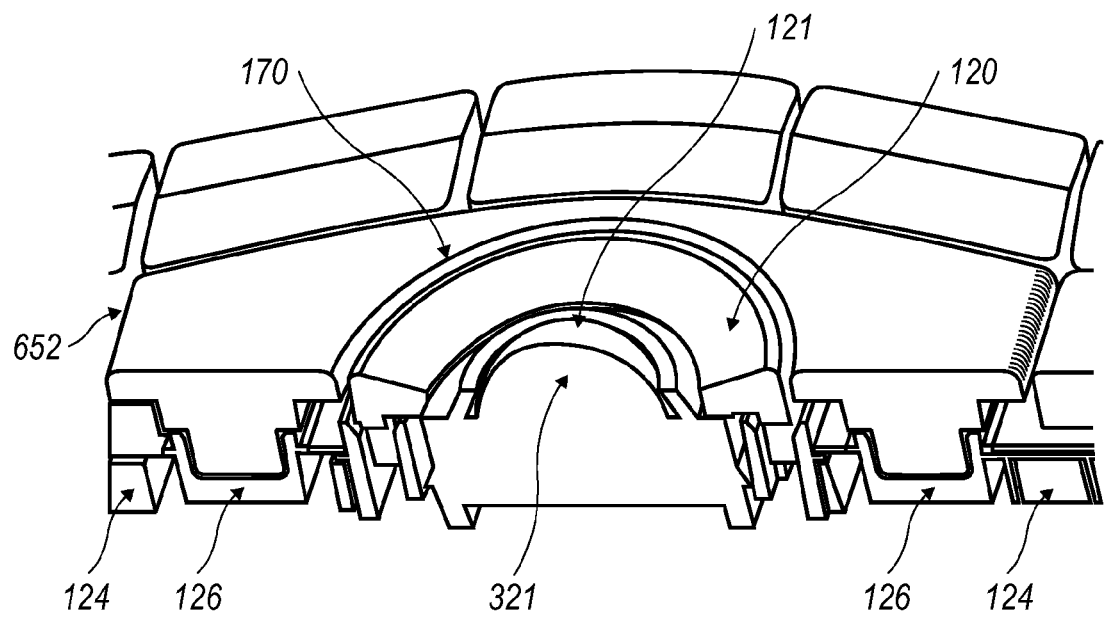
FIG. 9 illustrates a cross-sectional view of the pair of conjoined, depressibly actuable input keys of FIG. 8.

FIG. 9 illustrates a cross-sectional view of the trackball 321 and the conjoined, depressibly actuable input keys 652 and related support structure of the keyboard along Line A of FIG. 7. The trackball 321 fits within the circularly-shaped periphery of the pair of conjoined depressibly actuable input keys 652. Additionally in the embodiment as illustrated, the trackball 321 is located at a recess 170 in the front face 370 of the body 371 of the handheld electronic device 300. The recess 170 is shaped as an interiorly concave circular band 120 around the trackball 321. The interiorly concave circular band 120 is shaped such that the inner surface of the band 120 is lower in relation to the outer edge. The trackball further is retained by a retaining ring 121 which is concentrically located within the interiorly concave circular band 120. The support structure shown beneath the keys features a light guide 124 and resilient receivers 126 for the keys. The resilient receivers 126 support the key and enable the key to be depressible and are made of a material to distribute light received from the light guides 124. The light guides 124 distribute the light from one or more surfaces throughout the understructure of the keyboard to enable illumination of the keys. The light is further carried to the resilient receivers 126 which can then emit the light to the keys. In at least one embodiment, the resilient receivers are made from a silicon rubber, but in other embodiments are pliable materials such as rubber or various types of plastics. In one embodiment, the resilient receiver accommodates depression of each of the pair of conjoined, depressibly actuable input keys 652 on the device 300.

Figure 10:
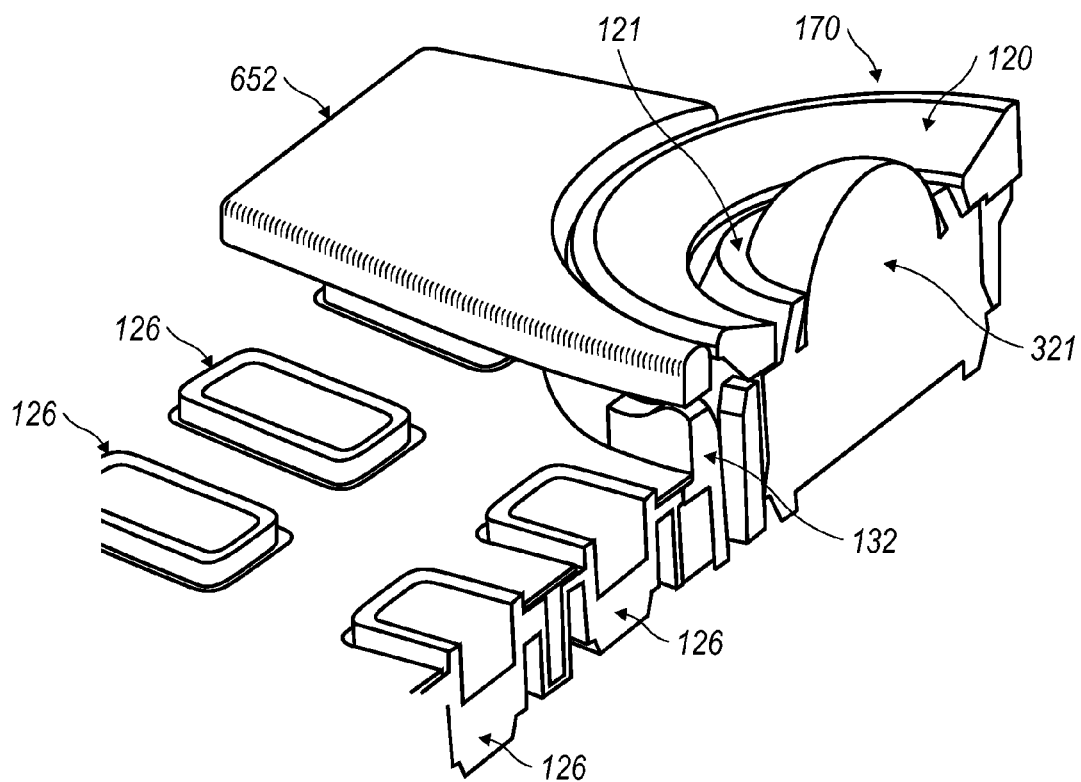
FIG. 10 illustrates another cross-sectional view of the pair of conjoined, depressibly actuable input keys.

FIG. 10 illustrates a cross-sectional view along the vertical center line of FIG. 7, with a specific focus being placed upon the trackball 321 and the pair of conjoined, depressibly actuable input keys 652. A central fulcrum 132 centered relative to and below the trackball 321 allows the conjoined, depressibly actuable input keys 652 to pivot. Thus, the conjoined, depressibly actuable input keys 652 can also be described as a monolithic rocking, two-switch actuator seated in a resilient receiver 126. In one embodiment, the central fulcrum 132 has approximately 0.3 millimeters of clearance between the top of the central fulcrum 132 and the bottom of the conjoined, depressibly actuable input keys 652. This allows the conjoined, depressibly actuable input keys to function as a toggle key of sorts or rock back and forth from the fulcrum 132. Other resilient receivers 126 for the keyboard are also illustrated in FIG. 10. These other resilient receivers accommodate the keys of the keyboard and provide a support structure for these keys in substantially similar fashion as that provided by the resilient receivers described in connection with the conjoined, depressibly actuable input keys 652.

Figure 11:
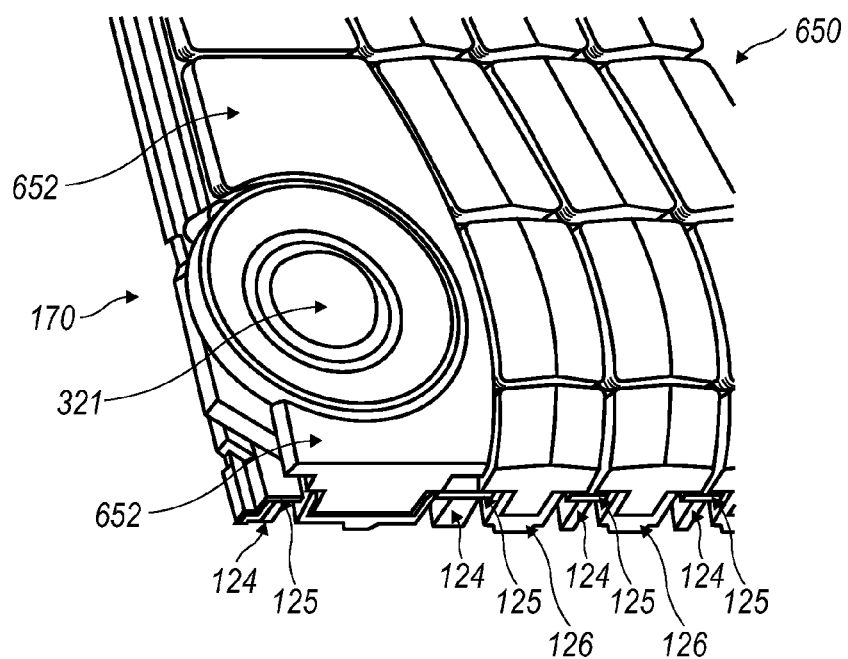
FIG. 11 illustrates a perspective cross-sectional view of the conjoined, depressibly actuable input keys and a keypad of the handheld device situated above a corresponding support structure.

The placement of the keyboard into the resilient receivers 126 can be further illustrated by FIG. 11. The keys fit into the resilient receivers as described above. Light guides 124 pass the light through the resilient receivers so that the keys can be illuminated. Additionally light shields 125 are provided to prevent inadvertent emission of light from the keyboard. This allows the light to come from the portion of the key that is designed for emission of the light from its front face portion and preventing the emission of light from the area between the keys.

Examplary embodiments have been described hereinabove regarding both handheld electronic devices 300, as well as the communication networks 319 within which they can operate. Again, it should be appreciated that the focus of the present disclosure is providing a pair of conjoined, depressibly actuable input keys located substantially opposite the other across a navigation tool assembly.

What is claimed is:

1. A handheld electronic device configured to receive data communications, the device comprising:
   a body having a front face;
   a display screen located on the front face of the body and upon which information is displayed;
   a navigation row located on the front face of the body below the display screen, the navigation row comprising:
   a track-based navigation tool assembly;
   a pair of actuable input keys laterally flanking the track-based navigation tool assembly, the pair of actuable input keys constitute a monolithic rocking, two-switch actuator, the track-based navigation tool assembly being located between the pair of actuable input keys and configured to extend below the pair of actuable input keys;
   a conjoining portion positioned adjacent to the track-based navigation tool assembly to enable the multi-directional navigation tool assembly to extend below the conjoining portion, the conjoining portion being provided to physically couple the pair of actuable input keys so that the conjoining portion and the pair of actuable input keys together cover between one half and three quarters of an area surrounding the navigation tool assembly to provide a uniform surface that substantially surrounds the navigation tool assembly; and
   a fulcrum positioned to engage the conjoining portion to enable the pair of actuable input keys to toggle about the fulcrum; and
   a microprocessor configured to receive electrical signals from the navigation tool assembly and the input keys, the microprocessor instructing commensurate changes to the display screen.

2. The handheld electronic device as recited in claim 1, wherein the track-based navigation tool assembly comprises a trackball.

3. The handheld electronic device as recited in claim 2, wherein the pair of actuable input keys pivot about the fulcrum, the fulcrum being centered relative to, and below the trackball.

4. The handheld electronic device as recited in claim 2, wherein the pair of actuable input keys each comprises an extension portion that projects from a lower surface of the pair of actuable input keys toward an actuable switch located within the device.

5. The handheld electronic device as recited in claim 1, wherein the monolithic rocking, two-switch actuator is seated in a resilient receiver that accommodates depression of each of the pair of actuable input keys on the device.

6. The handheld electronic device as recited in claim 2, wherein the body is hand cradleable and configured to be held in one hand of the operator of the device during data entry.

7. The handheld electronic device as recited in claim 6, wherein the trackball is located at a recess in the front face of the body of the device.

8. The handheld electronic device as recited in claim 7, wherein the recess is shaped as an interiorly concave circular band around the trackball.

9. The handheld electronic device as recited in claim 2, wherein the navigation row further comprises: a pair of outer keys, each outer key being located substantially opposite to one another across the navigation tool assembly and each outer key being outboardly positioned adjacent to a laterally outer edge of the actuable input keys.

10. The handheld electronic device as recited in claim 9, wherein one of the pair of outer keys is a call cancel key.

11. The handheld electronic device as recited in claim 9, wherein one of the pair of outer keys is a call key.

12. The handheld electronic device as recited in claim 11, wherein a right hand outer key is call cancel key and a left hand outer key is a call key.

13. The handheld electronic device as recited in claim 2, further comprising: a key field located at the front face of the body, the key field comprising a plurality of keys of which a portion are alphanumeric input keys and a portion are function keys, the alphanumeric input keys comprising a plurality of alphabetic keys having letters associated therewith that are arranged in one of a QWERTY, QWERTZ, AZERTY, and Dvorak arrangement for facilitating data entry.

14. The handheld electronic device as recited in claim 13, wherein the key field and the navigation row are substantially mirror symmetric about a vertical centerline.

15. The handheld electronic device as recited in claim 14, wherein the body is elongate with a longitudinal axis parallel to the vertical centerline.

16. The handheld electronic device as recited in claim 15, wherein the device is configured such that the display is oriented in a top portion of the body during data entry and the key field is oriented in a bottom portion of the body during data entry.

17. The handheld electronic device as recited in claim 1, wherein one of the pair of actuable input keys is a menu key that upon actuation displays an available action menu on the display.

18. The handheld electronic device as recited in claim 1, wherein one of the pair of actuable input keys is an escape key that upon actuation displays a previously presented application page on the display.

19. The handheld electronic device as recited in claim 1, wherein the device is configurable to send and receive voice communications.

* * * * *